UNITED STATES PATENT OFFICE.

AUGUST WITTHAUER, OF PITTSBURG, PENNSYLVANIA.

ORNAMENTATION OF GLASSWARE.

SPECIFICATION forming part of Letters Patent No. 353,523, dated November 30, 1886.

Application filed June 18, 1886. Serial No. 205,572. (No specimens.)

*To all whom it may concern:*

Be it known that I, AUGUST WITTHAUER, of Pittsburg, in the county of Allegheny and State of Pennsylvania, have invented certain new and useful Improvements in the Ornamentation of Glassware; and I do hereby declare the following to be a full, clear, and exact description of the invention, such as will enable others skilled in the art to which it pertains to make and use it, reference being had to the accompanying drawings, which form part of this specification.

My invention relates to an improvement in the ornamentation of glassware; and it consists in a compound composed of ale, beer, Epsom salts, and niter, together with any suitable coloring-matters, as will be more fully described hereinafter.

The object of my invention is to produce a fluid which is to be applied to the surface of glass and then covered over by suitable coloring materials, the fluid and the coloring-matter then being worked or mixed together, so as to impart to the glass the appearance of marble or other stone, and which glass, thus decorated, is adapted to be used for tiles, covers for tables, panels, mantel-pieces, and ornamental work of all kinds.

In making my compound, I take about one-half-pint of ale, one pint of beer, one ounce of Epsom salts, and one-fourth ounce of niter. These four ingredients are mixed thoroughly together and then allowed to stand about twelve hours. The niter serves to clear and brighten the crystals, so as to show the colors better when added. The surface of the glass to which the compound is to be applied is first cleaned, and then the surface of the glass is painted over with the compound, giving one, two, or more coats, as may be desired. Over the top of the compound which has been painted or coated upon the glass is sprinkled one or more colors of any suitable kind, and then those colors are worked into the coat upon the glass, either by the fingers, by the brush, or by any other suitable manner. All sorts of figures and designs may be produced in the working of the coloring-matter and the coats together, thus imparting through the glass the effect of variegated marble or other ornamental stone. After the color has been worked into the coating upon the glass, the glass is placed in the sun or any warm place where it will quickly dry, and then the glass is ready to be used in ornamental work of any kind.

The pieces of glass ornamented may be used in making mantel-pieces, tiles, panels, boxes, or articles of any kind that may be desired.

Having thus described my invention, I claim—

A compound for ornamentation of glass, consisting of ale, beer, Epsom salts, and niter, in or about the proportions specified.

In testimony whereof I affix my signature in presence of two witnesses.

AUGUST WITTHAUER.

Witnesses:
F. A. LEHMANN,
M. P. CALLAN.